United States Patent
Hall

(10) Patent No.: US 11,518,459 B2
(45) Date of Patent: Dec. 6, 2022

(54) DEVICE FOR REMOVING, STORING AND INSTALLING REMOVABLE VEHICLE DOORS AND METHOD OF USE

(71) Applicant: Frederick Hall, Spring Hill, FL (US)

(72) Inventor: Frederick Hall, Spring Hill, FL (US)

(73) Assignee: Norge Holdings, LLC, Melbourne, FL (US)

( * ) Notice: Subject to any disclaimer, the term of this patent is extended or adjusted under 35 U.S.C. 154(b) by 0 days.

(21) Appl. No.: 17/588,792

(22) Filed: Jan. 31, 2022

(65) Prior Publication Data

US 2022/0153368 A1    May 19, 2022

Related U.S. Application Data

(63) Continuation of application No. 16/953,732, filed on Nov. 20, 2020.

(60) Provisional application No. 62/938,785, filed on Nov. 21, 2019.

(51) Int. Cl.
*B62D 65/06* (2006.01)
*B62D 65/02* (2006.01)

(52) U.S. Cl.
CPC ........... *B62D 65/06* (2013.01); *B62D 65/026* (2013.01)

(58) Field of Classification Search
CPC .......... B62B 3/0643; B62B 3/04; B62B 3/10; B62B 3/108; B62B 2203/073; B62B 2203/10; B62B 3/005; B62B 3/02
See application file for complete search history.

(56) References Cited

U.S. PATENT DOCUMENTS 10,407,087 B1 * 9/2019 Baker .................... B62B 3/005

FOREIGN PATENT DOCUMENTS

JP    2014213409 A   * 11/2014

OTHER PUBLICATIONS

U.S. Appl. No. 16/172,736, filed Oct. 27, 2018, Hall.
"Performance TV—EP 1708" (Masters Entertainment Group) Mar. 21, 2017, URL: http://www/youtube.com/watch?time_continue=3&v=YrHdMCw5Z14&feature=emb_logo>entire document, esp. 6:30-11:30.
"Source Code" (TopLift Pros) Feb. 12, 2020 (Feb. 12, 2020) <URL: https://uploads-ssl.webflow.com/59249fc364efbd2b0eb398bc/5a95acfc892ae800019375f1_Instruction_Manual_v4.0.compressed_pdf> Assembly instructions.

* cited by examiner

*Primary Examiner* — Jason L Vaughan
*Assistant Examiner* — Amanda Kreiling
(74) *Attorney, Agent, or Firm* — William Gray Mitchell

(57) ABSTRACT

A mobile device designed for the removal, storage, and installation of removable vehicle doors comprising a wheeled base unit, a vertical frame and clamps.

4 Claims, 4 Drawing Sheets

DEVICE FOR REMOVING, STORING AND INSTALLING REMOVABLE VEHICLE DOORS AND METHOD OF USE

CROSS REFERENCE TO RELATED APPLICATIONS

This application claims priority to U.S. patent application Ser. No. 16/953,732, filed Nov. 20, 2020, and thence to U.S. provisional patent application 62/938,785, filed Nov. 21, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a device for the removal, storage and installation of convertible sport utility vehicle (SUV) and other removable vehicle doors.

Background of the Invention

Convertible two door and four door SUVs are often sold with removable doors standard or optionally available. Removable SUV doors tend to be both heavy and unwieldy, weighing between 45 and 75 pounds apiece, as would be expected in a safety-driven design environment. In particular, a single person attempting removal or reinstallation faces the difficulty of holding the weight of the door while also having at least one hand free and able to reach the release mechanisms on the vehicle to complete the operation. Obviously, the operation is more difficult for disabled persons and those smaller in stature or able to lift less weight.

In order to aid the process of installing and removing doors from the convertible SUVs, many owners will utilize overhead lifts, pullies or other homemade simple machine devices that tend to be ungainly and carry the risk of either damaging the door, the side of the vehicle or injuring the user.

Additionally, it takes strength to move a detached door away from the vehicle and store it. As such, removal and reinstallation of such doors can be simplified greatly with the use of a structure to take the weight of the door during the operation of removal and reinstallation. Ideally, such structure would be able to engage more than one door at a time, allowing the user to remove two or more doors in a single operation. Further, making such structure mobile can allow the user to easily move and store multiple heavy doors at once.

It is the object of the present invention to provide an apparatus which allows a single operator to install and remove one or more doors from a convertible SUV, withdraw the doors from the vehicle and store them in a garage or other enclosure, while requiring minimal floor space.

BRIEF SUMMARY OF THE INVENTION

In a preferred embodiment, a device for removing, storing, and installing removable doors from vehicles comprising: a wheeled base unit which is sufficiently long and wide to support the device from longitudinal and axial moments with and without the door(s) installed; a U-shaped vertical frame having two frame legs and a frame top, each leg comprising a frame end, wherein said frame end is affixed to said movable base by insertion into a corresponding frame receiver; one or more door slots running the length of the movable base into which the removable door(s) may be seated; and wherein the device may be positioned to place a removable door into the door slot while the door hinges are unfastened, allowing the door to be immobilized on the device for removal.

In another preferred embodiment, the device as described herein, wherein the wheeled base comprises four or more casters.

In another preferred embodiment, the device as described herein, wherein each caster is vertically adjustable.

In another preferred embodiment, the device as described herein, wherein each door slot is comprised of hardened rubber or a similar material unlikely to scratch or dent the door metal.

In another preferred embodiment, the device as described herein, wherein the vertical support structure is embodied as an adjustable tubular member, with adjustment mechanisms at each frame receiver allowing the tubular member to raise and lower.

In another preferred embodiment, the device as described herein, wherein a plurality of casters from 3" to 6" in diameter are attached to the underside of the movable base.

In another preferred embodiment, the device as described herein, further comprising wherein molded pads are affixed to the frame top to cushion and protect the door(s) upon engagement and removal by the device.

In another preferred embodiment, the device as described herein, further comprising a center rod.

In another preferred embodiment, the device as described herein, wherein at least one top clamp is attached to the frame top by a clamp screw, wherein such top clamp comprises two jaws and can be raised and lowered by the screw and swiveled using a clamp handle to overlay a seated door.

In another preferred embodiment, the device as described herein, wherein each jaw of the top clamp is angled away from a center of the clamp at approximately 10-40 degrees.

In another preferred embodiment, the device described herein, wherein the clamp comprises an overlapping male jaw and female jaw, as well as at least two clamp bolts for widening and narrowing such jaws.

In another preferred embodiment, a method of removing a door from a vehicle using the device of claim 1, comprising the steps: rolling the device adjacent to a vehicle with removable doors; optionally adjusting the casters on the wheeled base to match the height of the door slot with a lower edge of the door; sliding the door into the door slot until the door's weight is supported by the wheeled base unit; detaching the door from the vehicle; leaning the door against the vertical frame; rolling the device away from the location of the removed door and to another vehicle door; and repeating the previous steps until all desired doors have been removed.

In another preferred embodiment, a method of removing a door from a vehicle using the device as described herein, comprising the steps: rolling the device adjacent to a vehicle with removable doors; optionally adjusting the casters on the wheeled base to match the height of the door slot with a lower edge of the door; sliding the door into the door slot until the door's weight is supported by the wheeled base unit; detaching the door from the vehicle; leaning the door against the vertical frame; adjusting the top clamp until it overlays and secures the door against the vertical frame; rolling the device away from the location of the removed door and to another vehicle door; and repeating the previous steps until all desired doors have been removed.

DETAILED DESCRIPTION OF THE INVENTION

Figure 1:
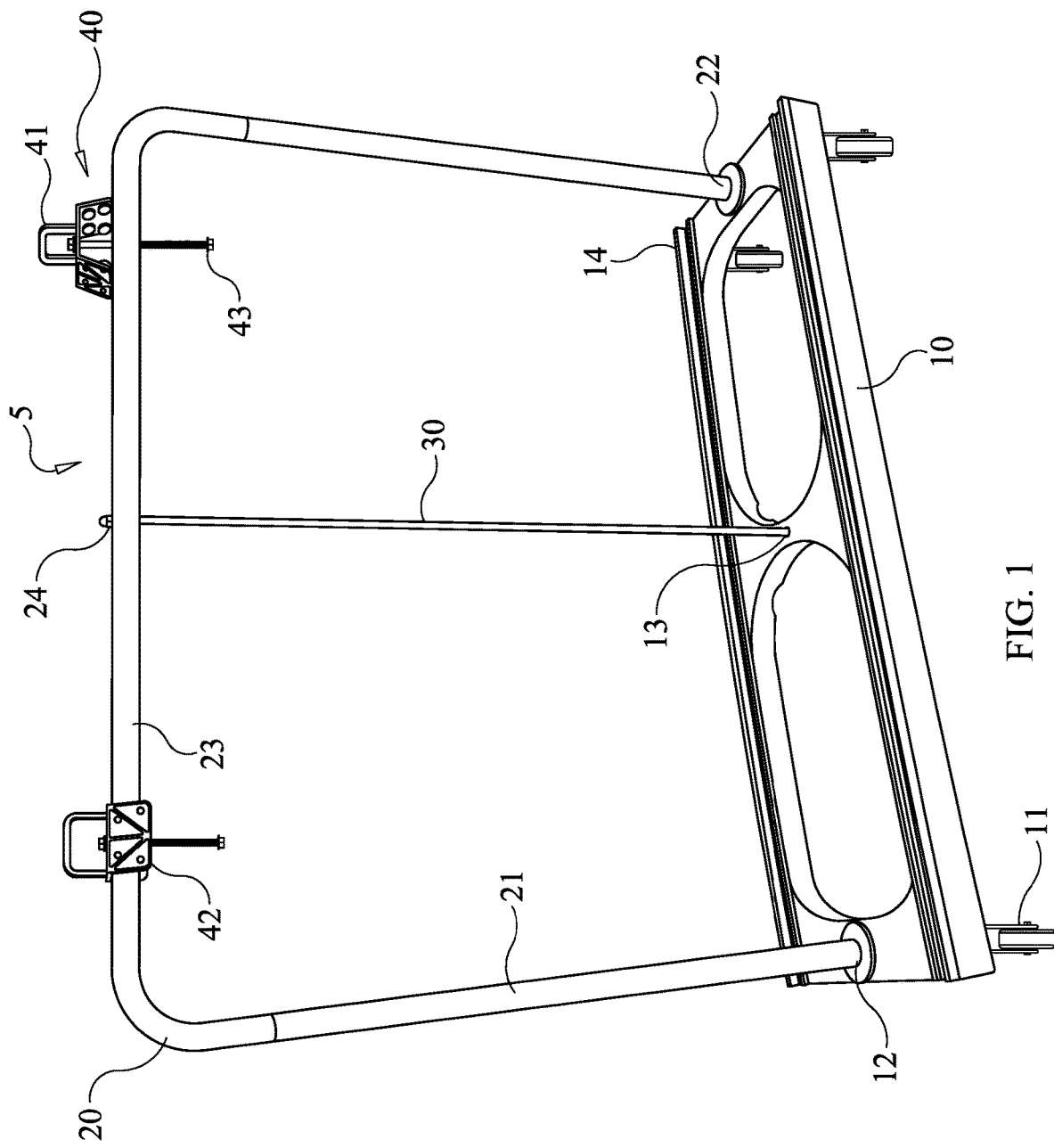
FIG. 1 is a line drawing evidencing a perspective view of a SUV door removal device.

As shown in the drawings, the disclosed vehicle door removal, storage and installation device is comprised of an extendable U-shaped frame, attached to a base unit, wherein the frame can be adjusted vertically. Attached between the two legs of the U-shaped vertical frame is the base unit with casters or wheels which extends from the vertical support legs towards the vehicle. The base is preferably made of a material that will inhibit the scratching or denting the lower door edge, such as plastic or hardened rubber. In one embodiment, the base will have at least one, preferably two, rubberized channel "door slot" component(s) within which the lower edge of a door may be inserted such that, together with a hanging clamp located on the upper portion of the railing, the door may be immobilized during removal and storage. Preferably, the base will be vertically adjustable on its casters to match the height of the door to be removed or replaced, and the door slot will run along the longer side of the rectangular base, such that two doors may be stored in a single door slot in a back-to-front configuration.

Attached to the top of the vertical frame is at least one hanging mechanism, such as a clamp, for attaching and securing a vehicle door to the frame while the door rests on in the door slot. In certain embodiments, the U-shaped railing is elongated sufficiently to arrange two or more hanging clamps so that multiple doors may be engaged and stored simultaneously. In a preferred embodiment, the U-shaped railing will further be connected to the base by one or more stabilizing bars located centrally in the U formation of the railing. In a preferred embodiment, the railing is comprised of two legs that arc towards one another with a straight frame top running between such legs. Together, the legs and top form a single railing upon which vehicle doors are able to lean at an angle from the door slot arranged at the outer edge of the base unit to the frame top, where each top door frame can lean for stability and further be secured by a top clamp to prevent the door from shifting or falling over.

Each top clamp is preferably embodied as an adjustable clamp with two clamp jaws overlaying and connected to the railing, either by a clamp screw assembly or other known method. The clamp itself is preferably made of a solid but malleable material such as hardened plastic or rubber such that it can exert pressure on the upper edge of the door without scratching or denting. Alternatively, it is made of metal overlaid with a rubber or similar coating or pad on the areas inside each clamp jaw that engage the door. The clamp is preferably tightened as the screw assembly holding the clamp to the railing is tightened. In one embodiment, once a door has been inserted into the rubberized channel on the base, the clamp may be tightened downward onto the upper edge of the door via the screw assembly through the railing, and thus secure and immobilize the door.

In a preferred embodiment, each top clamp comprises an handle for manipulating and swiveling the clamp. Each clamp will be able to engage different widths of doors that are side by side, each resting within its door slot on the base unit and leaning inward to the horizontal frame top. Each top clamp is adjustable to the desired location to hold a set of one or two doors in place. Each clamp has a center hole of which a clamp screw is installed vertically through this hole and then through a corresponding hole in rail with a spring that receives the balance length of the bolt followed with stopper and nut. This spring creates tension immobilizing the door from lateral movement. Each clamp freely moves 360 degrees and is designed to lift, twist ninety degrees to allow the clamp jaws to rest atop the horizontal portion of the frame while the door(s) are slid into place. Once the one or two doors are slotted and leaned against the frame top, the clamp is twisted ninety degrees the jaws are dropped over the single door and frame top, or both doors, as appropriate.

As removable doors from various models of vehicles may vary in width, each clamp jaw is preferably angled outward from the center of the clamp at an angle between 10 degrees and 45 degrees. Further, in a preferred embodiment, the clamp is fashioned with a mail jaw and female jaw, with the two jaws overlapping one another with a pair of clamp bolts and respective bolt slides embodied as slots, wherein the bolts can be loosened to allow the jaws to be spread further apart or, alternatively, narrowed to match the gauge of the door(s) to be secured. For stability, this design preferably includes a jaw protrusion emanating from the male clamp jaw and protruding into a corresponding jaw inlet in the female clamp jaw component.

When the door removal device is operated to remove a vehicle door, the device is manually maneuvered by the operator into position next to the vehicle. The unit is maneuvered so that the platform assembly is aligned with the door to be removed, such that the open door may slide into a rubberized door slot on the base. The casters, if adjustable, can be ratcheted up or down to approximate the height of the lower edge of the door. Once the door is seated in the door slot, the top clamp can then be swiveled and dropped to secure the upper door edge. With door thus immobilized by the clamp/frame and its weight supported by the base unit, the hinges of the door may then be released and the door removed from the vehicle by pushing the device on its casters. In an alternate method, the railing may be adjusted to the height of the door, then the clamp applied to the door top, and the door then lowered with the adjustable railing until it is seated in the door slot. The means of adjustment may comprise clamps or similar means to secure at frame receiver holes at frame receivers comprising the point of insertion into the base, allowing adjustment of the length of the frame lowered into the base.

As a method of use, the door removal device will be sidled next to a vehicle such that a detachable door may be opened and slid along one of the door slots on the wheeled base of the device until the device is positioned to support most or all of the door weight. At that point, the door may be detached and leaned against the vertical frame of the removal device. Since most doors weigh 40-75 pounds and are several feet high, the weight of the door will keep the door from moving substantially as long as the device itself is also reasonably still. Optionally, a second door may then be notched into the same slot and detached in turn.

At this point, the user may choose to move the door clamps down from their upper, resting position atop the frame top and over the one or two removed doors. This is effect by a combination of rotating the bodies of the clamps and bringing the clamp jaws in line with the frame top, then screwing the clamp screw to bring each clamp down over the corresponding door.

With each door thus secured, the device may then be rolled on its casters around the vehicle to remove one or two doors on that side. In the event that four doors are being used, the user will be required to use the second door slot on the opposite side of the base. Once these doors are in the slot, the clamps may then be raised using the screws so that each clamp may then be lowered again over the two door top on either side of the frame top. Once all four doors are thus secured, the entire device may then be rolled to the user's chosen storage location.

A vehicle door(s) thus removed can then be rolled on the removal device to a storage location and later be repositioned next to the vehicle at the door hinge site reinstalled by reversing the process. Once aligned, the operator will re-engage the hinges and, release the hanging clamp and slide the device along the rubberized channel allowing the reattached door to again hang onto the vehicle.

While the description above describes a device designed for the removal of detachable vehicle doors, as there is currently a demand for this type of device, the described device with minor modifications known to those skilled in the art could also be used for removing different types of vehicle doors, including but not limited to removable doors for cars, trucks, vans and military vehicles.

Detailed Description of the Figures

FIG. 1 shows a perspective view of the SUV door removal device 5, wherein wheeled base unit 10 on casters 11 forms a base with frame receivers 12 embodied as holes with a raised circumference into which each end 22 of a vertical frame 20 fits. In the pictured embodiment, the base unit 10 is made of molded plastic or similar material and the vertical frame 20 is made of metal piping, preferably hollow, such that the frame ends fit into the frame receivers snugly to ensure stability. Additional means for securing the frame such as bolts or pins are optionally available, but are preferably not required as each frame end comprises 2 or more inches of pipe that snugly fits into its respective receiver hole.

Vertical frame 20 is further stabilized by center bolt 30, embodied as a single, elongated steel bolt running down the very center of the door removal device from a first center rod hole 24, bored through each side of the pipe comprising frame top 23, to a second center rod hole 13, molded in the center of the base unit. The center rod hole is preferably threaded at least on its ends and secured with nuts.

The base unit 10 is shaped as a rectangle with two long sides and two ends. Running the length of each long side is a door slot 14, embodied as two molded, raised edges, with sufficient space between such that a removable vehicle door may be placed within and slid along as necessary. Ideally, the length of each door slot will be sufficient that two removable doors 1 (not pictured) can be fully secured, in line, within a single slot.

Finally, on the frame top 23, between the frame leg 21 and center rod hole 24 is located a top clamp 40 for securing one or two removable doors to the device. Each clamp comprises a handle 41 and a clamp screw 43, which screw attaches the center of the clamp to a fixed position on the frame top 23. Preferably, the clamp screw is threaded and can be thus adjusted up and down to allow the clamp to be placed in a lower clamping position, as evidenced by the clamp on the left, as well as in an upper resting position, as evidenced by the clamp on the right.

Figure 2:
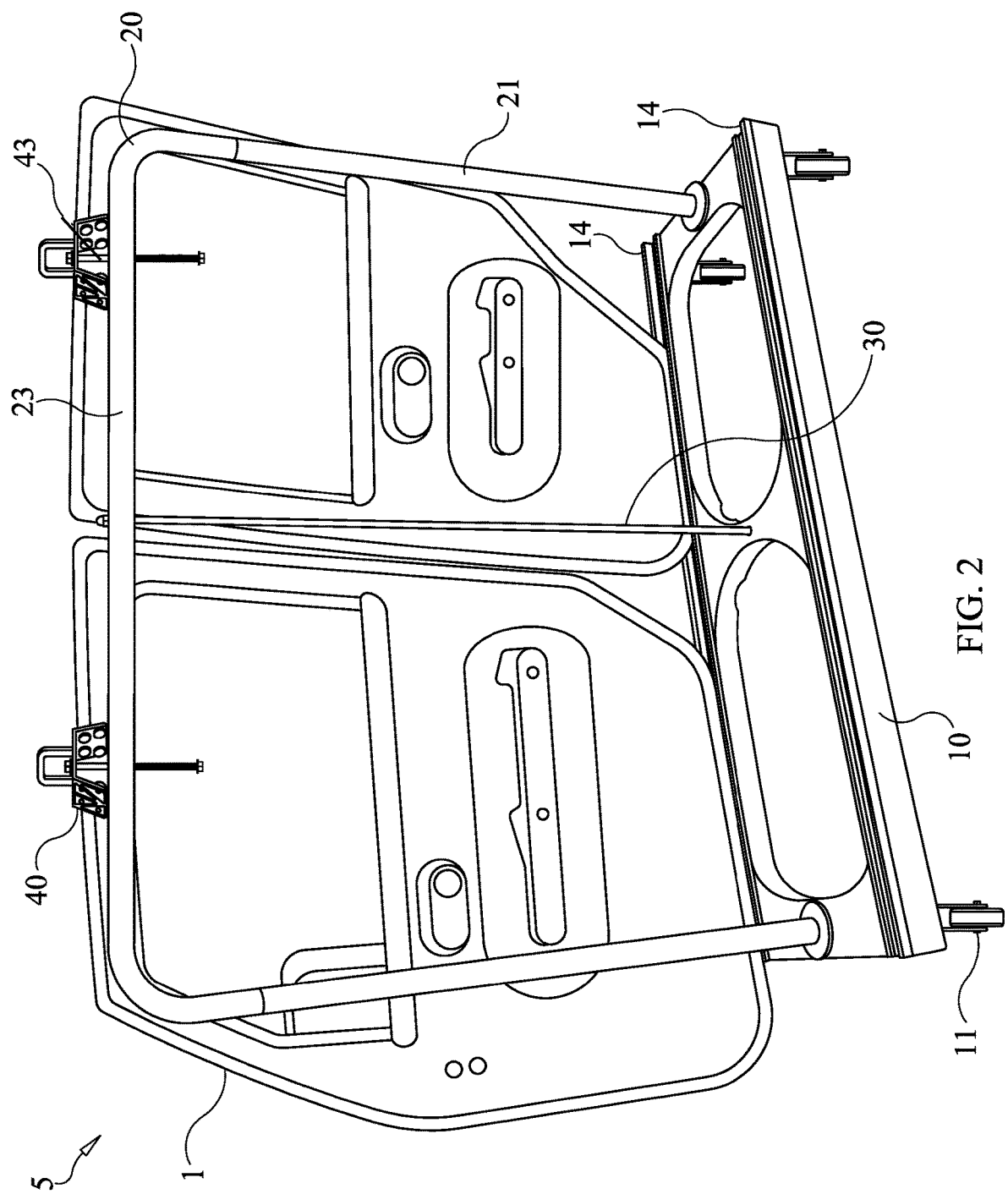
FIG. 2 is a line drawing evidencing the SUV door removal device of FIG. 1, with two doors stored on one side.

FIG. 2 shows a second view of the door removal device 5, wherein two removable doors 1, a front and back door, have been placed back-to-front within the further door slot 14 in the wheeled base unit 10. The drawing evidences a stage of door removal wherein the two doors have been detached from one side of a SUV 2 (not pictured). FIG. 2 shows wherein each door is resting in its door slot and leaning against the vertical frame 20, but each top clamp 40 is still arranged in its resting position atop the frame top 23, with the handle 41 perpendicular to the frame top 23 each clamp screw 43 adjusted upward, and thus neither clamp has yet been swiveled and lowered over its corresponding door. The arrangement of each door slot slightly outside the vertical frame allows the door, once resting in the slot, to be leaned against the vertical frame, wherein the door's own weight pressing against the outer edge of the slot on the bottom and against the vertical frame on the top provides a level of stability against tipping or displacement of the door. Depending on the level of stability of the door in its leaning position, the user may wish to temporarily lower each clamp before moving the device on its casters 11 to the other SUV side for removal of the other two doors into the opposite, open door slot 14.

Figure 3:
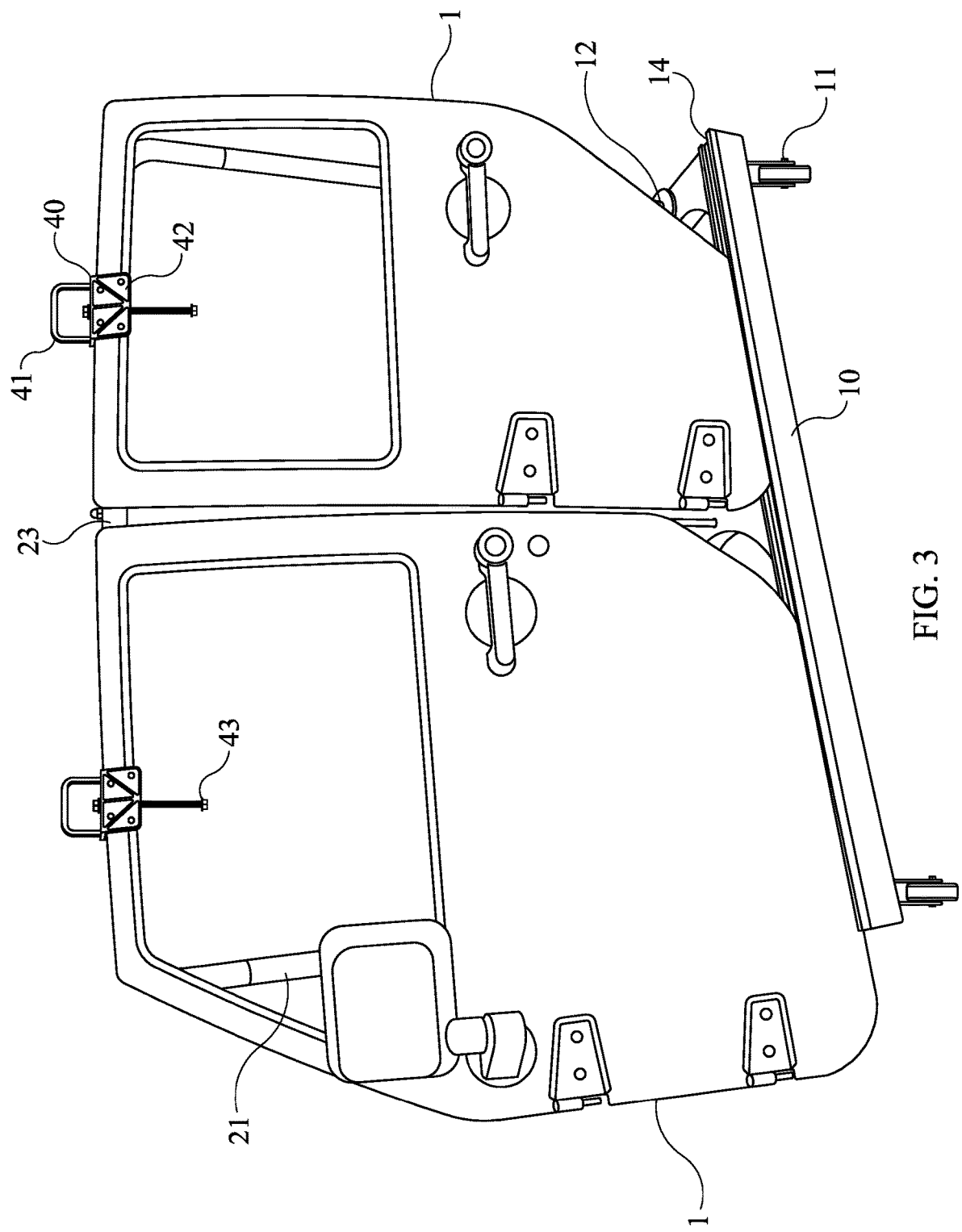
FIG. 3 is a line drawing showing the alternate side view of the device of FIG. 2.

FIG. 3 is an alternate view of the door removal device 5 of FIG. 2, this time with the two removable doors 1 located in the nearer door slot 14. In this view, the top clamps 40 have been swiveled, with the clamp handles 41 parallel to the frame top 23 and the clamp screws 43 adjusted down, allowing each clamp to be lowered so that the clamp jaws 42 overlay the door top. In comparison to the arrangement of FIG. 2, the doors should now be more secure for movement of the door removal device.

Figure 4:
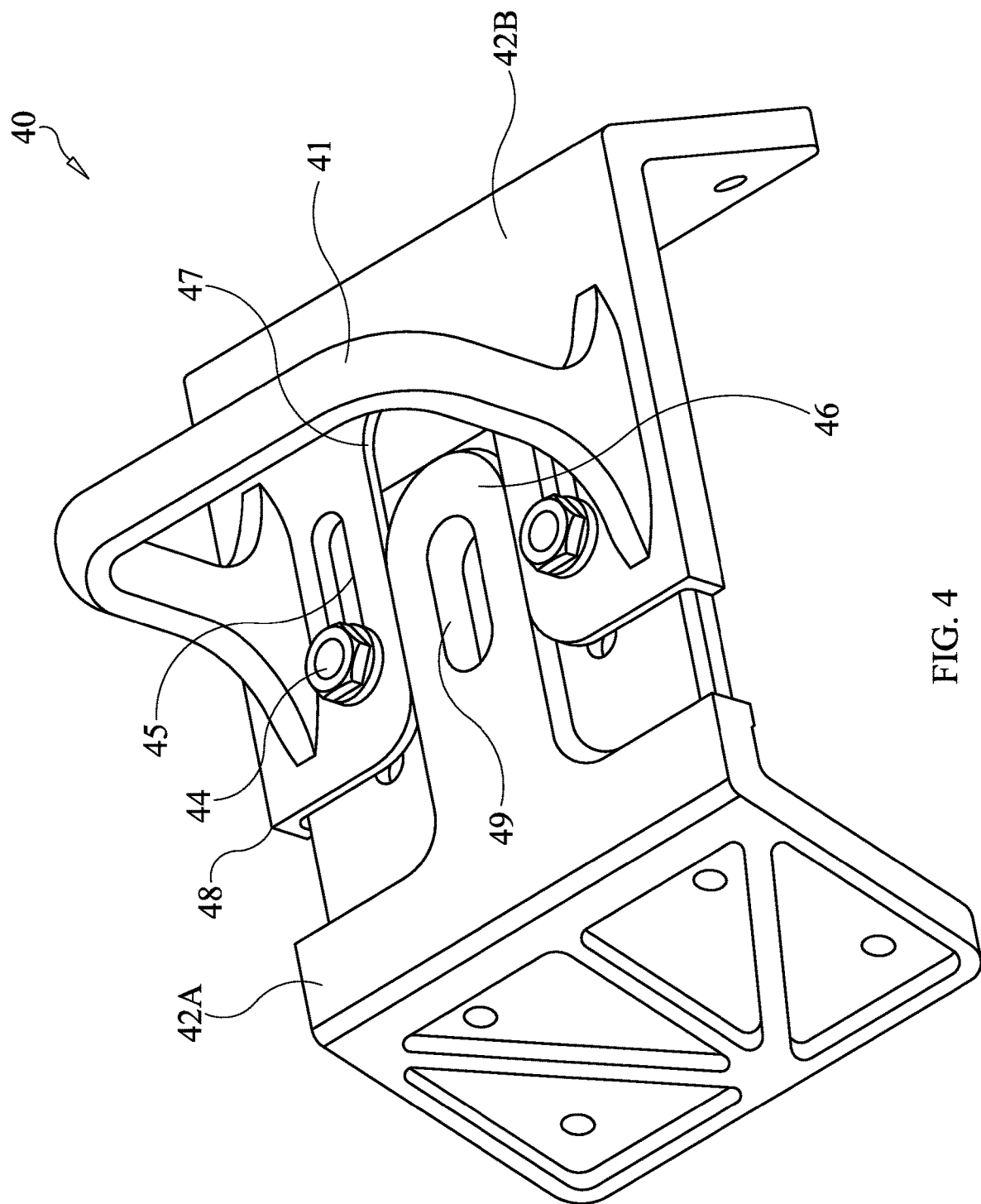
FIG. 4 is a line drawing showing a perspective view of the clamp evidenced in the previous figures.

FIG. 4 is a line drawing evidencing a perspective view of a top clamp 40. The clamp is comprised of a handle 41 for swiveling the clamp. In a preferred embodiment, the clamp is fashioned with a male jaw 42A and female jaw 42B, with the two jaws overlapping one another with a pair of clamp bolts 44 and respective bolt slides 45 embodied as slots, wherein the bolts can be loosened to allow the jaws to be spread or narrowed to match the gauge of the door(s) to be secured. For stability, this design preferably includes a jaw protrusion 46 emanating from the male clamp jaw and protruding into a corresponding jaw inlet 47 in the female clamp jaw component. In a more preferred design, the female jaw is embodied to create a slot 48 into which the male jaw body may be located. A clamp screw hole 49, possible embodied as a slot, is preferably centrally located within the male jaw. Ideally, each clamp is made of a scratch-resistant material such as plastic or rubber, or metal overlaid with a plastic or rubber coat.

It would be appreciated by those skilled in the art that various changes and modifications can be made to the illustrated embodiments without departing from the spirit of the present invention. All such modifications and changes are intended to be covered by the appended claims.

List of Reference Numbers 1 removable door
2 convertible SUV
3 tires (of SUV)
5 door removal device
10 wheeled base unit
11 casters (wheels)
12 frame receivers
13 first center rod hole
14 door slot
20 vertical frame
21 frame legs
22 frame ends
23 frame top
24 second center rod hole
25 clamp holes
30 center rod
40 top clamp
41 handle
42 clamp jaws
42A male clamp jaw
42B female clamp jaw
43 clamp screw
44 clamp bolts
45 bolt slides
46 jaw protrusion
47 jaw inlet
48 female jaw slot
49 clamp screw hole The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A method of removing a door from a vehicle using a device for removing, storing, and installing removable doors from vehicles, such device comprising:
   a wheeled base unit which is sufficiently long and wide to support the device from longitudinal and axial moments with and without the door(s) installed;
   a U-shaped vertical frame having two frame legs and a frame top, each leg comprising a frame end, wherein said frame end is affixed to said moveable base by insertion into a corresponding frame receiver,
   one or more door slots running the length of the moveable base into which the removeable door(s) may be seated; and
   wherein the device may be positioned to place a removable door into the door slot while the door hinges are unfastened, allowing the door to be immobilized on the device for removal;
   such method comprising the following steps:
   1. rolling the device adjacent to a vehicle with removable doors;
   2. optionally adjusting the casters on the wheeled base to match the height of the door slot with a lower edge of the door;
   3. sliding the door into the door slot until the door's weight is supported by the wheeled base unit;
   4. detaching the door from the vehicle;
   5. leaning the door against the vertical frame;
   6. rolling the device away from the location of the removed door and to another vehicle door; and
   7. repeating steps 1-6 until all desired doors have been removed.

2. The method of claim 1, comprising step 3:
   3. sliding a door into a single door slot until both doors' weight is supported by the wheeled base unit.

3. A method of removing a door from a vehicle using a device for removing, storing, and installing removable doors from vehicles, such device comprising:
   a wheeled base unit which is sufficiently long and wide to support the device from longitudinal and axial moments with and without the door(s) installed;
   a U-shaped vertical frame having two frame legs and a frame top, each leg comprising a frame end, wherein said frame end is affixed to said movable base by insertion into a corresponding frame receiver;
   at least one top clamp attached to the frame top by a clamp screw, wherein such top clamp comprises two jaws and can be raised and lowered by the screw and swiveled using a clamp handle to overlay a seated door;
   one or more door slots running the length of the movable base into which the removable door(s) may be seated; and
   wherein the device may be positioned to place a removable door into the door slot while the door hinges are unfastened, allowing the door to be immobilized on the device for removal;
   such method comprising the following steps:
   1. rolling the device adjacent to a vehicle with removable doors;
   2. optionally adjusting the casters on the wheeled base to match the height of the door slot with a lower edge of the door;
   3. sliding the door into the door slot until the door's weight is supported by the wheeled base unit;
   4. detaching the door from the vehicle;
   5. leaning the door against the vertical frame;
   6. adjusting the top clamp until it overlays and secures the door against the vertical frame;
   7. rolling the device away from the location of the removed door and to another vehicle door; and
   8. repeating steps 1-7 until all desired doors have been removed.

4. The method of claim 3, comprising step 3:
   3. sliding a door into a single door slot until both doors' weight is supported by the wheeled base unit.

* * * * *